(12) United States Patent
Fu et al.

(10) Patent No.: US 11,799,383 B2
(45) Date of Patent: Oct. 24, 2023

(54) HYBRID DC-DC CONVERTER

(71) Applicant: MONOLITHIC POWER SYSTEMS, INC., San Jose, CA (US)

(72) Inventors: Dianbo Fu, San Jose, CA (US); Jinghai Zhou, Cupertino, CA (US); Daocheng Huang, Santa Clara, CA (US); Junjie Feng, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 129 days.

(21) Appl. No.: 17/671,814

(22) Filed: Feb. 15, 2022

(65) Prior Publication Data

US 2022/0263419 A1 Aug. 18, 2022

Related U.S. Application Data

(60) Provisional application No. 63/151,015, filed on Feb. 18, 2021.

(51) Int. Cl.
*H02M 3/335* (2006.01)
*H02M 1/00* (2006.01)
*H02M 3/00* (2006.01)

(52) U.S. Cl.
CPC ..... *H02M 3/33573* (2021.05); *H02M 1/0095* (2021.05); *H02M 3/33584* (2013.01); *H02M 3/01* (2021.05)

(58) Field of Classification Search
CPC ........ H02M 3/01; H02M 3/325; H02M 3/335; H02M 3/33573
See application file for complete search history.

(56) References Cited

U.S. PATENT DOCUMENTS

| | | | |
|---|---|---|---|
| 7,154,250 B2 | 12/2006 | Vinciarelli | |
| 8,669,744 B1 | 3/2014 | Vinciarelli | |
| 8,854,019 B1 | 10/2014 | Levesque et al. | |
| 9,490,709 B2 | 11/2016 | Lee et al. | |
| 9,548,668 B2 * | 1/2017 | Fu | H02M 3/33592 |
| 9,973,099 B2 * | 5/2018 | Ye | H02M 3/33576 |
| 2016/0094136 A1 * | 3/2016 | Fu | H02M 3/33584 363/21.02 |
| 2018/0309372 A1 * | 10/2018 | Leong | H02M 3/33546 |
| 2019/0214922 A1 * | 7/2019 | Notsch | H02M 3/285 |

* cited by examiner

*Primary Examiner* — Gary A Nash
(74) *Attorney, Agent, or Firm* — Beyer Law Group LLP

(57) ABSTRACT

A hybrid DC-DC converter includes a converter circuit, a bridge circuit with a bridge path that includes a winding of a transformer, and another bridge circuit with a bridge path that includes another winding of the transformer. Current through the bridge path of the other bridge circuit flows through the converter circuit in one direction and bypasses the converter circuit in the other direction. The converter circuit can operate in buck, boost, or buck-boost mode.

20 Claims, 3 Drawing Sheets

HYBRID DC-DC CONVERTER

CROSS-REFERENCE TO RELATED APPLICATION

This application claims the benefit of U.S. Provisional Application No. 63/151,015, filed on Feb. 18, 2021, which is incorporated herein by reference in its entirety.

BACKGROUND OF THE INVENTION

1. Field of the Invention

The present invention relates generally to electrical circuits, and more particularly but not exclusively to DC-DC converters.

2. Description of the Background Art

A DC-DC converter converts a DC input voltage to a regulated DC output voltage, which is higher than the input voltage in the case of a boost converter or lower than the input voltage in the case of a buck converter. DC-DC converters that allow for buck or boost operation are referred to as buck-boost converters. Yet another type of DC-DC converter generates a regulated output voltage at the same level as the input voltage.

Various circuit topologies have been developed to implement DC-DC converters. Examples of such circuit topologies include hard-switching full bridge, phase shift soft switching full bridge, and soft switching full bridge with a series resonant circuit. A DC-DC converter with a combination of circuit structures, such as a soft switching full bridge with a series resonant circuit, is referred to as a hybrid DC-DC converter.

Problems with currently-available DC-DC converters include low-efficiency, low power density, and relatively high manufacturing cost.

SUMMARY

In one embodiment, a hybrid DC-DC converter includes a converter circuit, a first bridge circuit with a bridge path that includes a first winding of a transformer, and a second bridge circuit with a bridge path that includes a second winding of the transformer. Current through the bridge path of the second bridge circuit flows through the converter circuit in one direction and bypasses the converter circuit in the other direction. The converter circuit can be configured to operate in buck, boost, or buck-boost mode.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
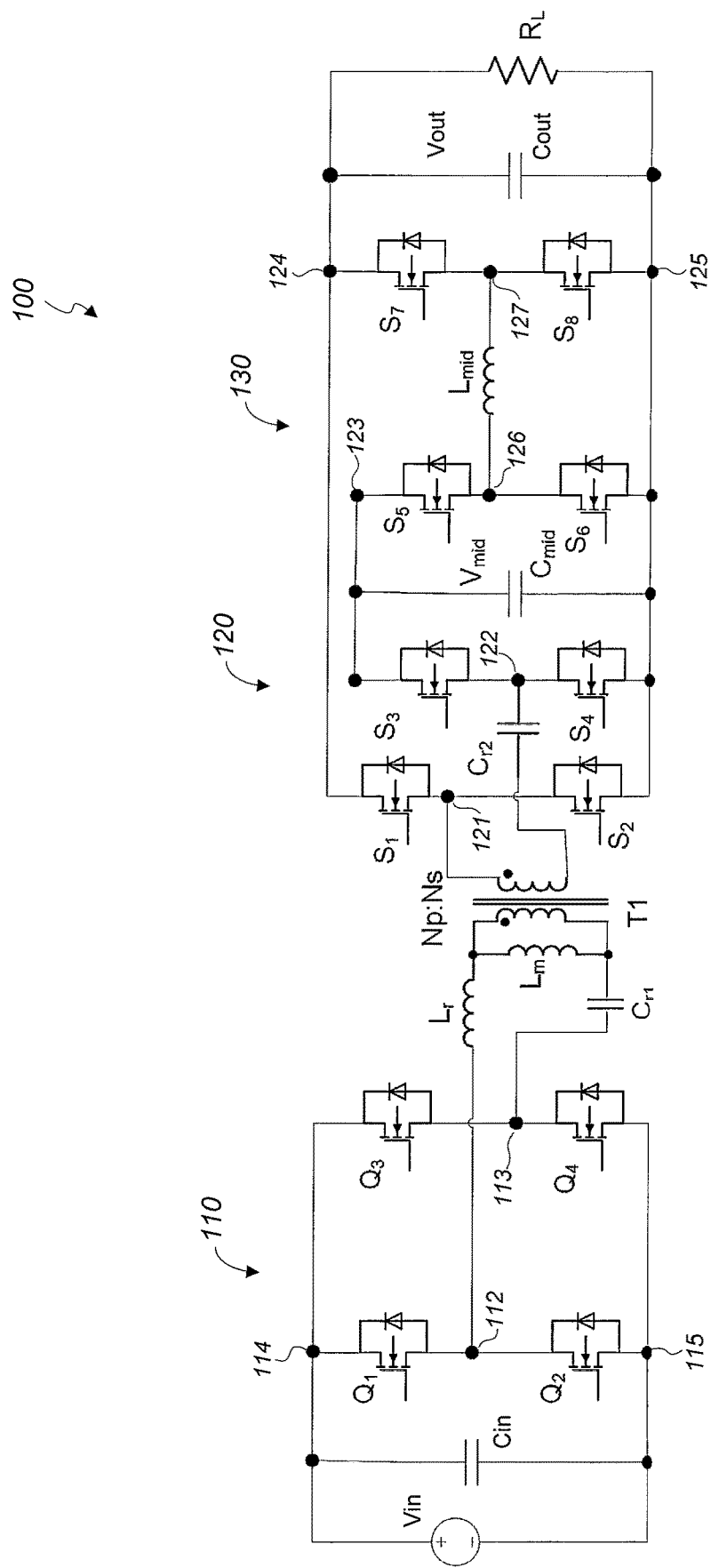
FIG. 1 shows a schematic diagram of a hybrid DC-DC converter in accordance with an embodiment of the present invention.

FIG. 1 shows a schematic diagram of a hybrid DC-DC converter 100 in accordance with an embodiment of the present invention. As will be more apparent below, the DC-DC converter 100 operates as a buck-boost converter.

In the example of FIG. 1, the DC-DC converter 100 includes a full bridge circuit 110, a full bridge circuit 120, and a converter circuit 130. The full bridge circuit 110 is on the primary side of a transformer T1, whereas the full bridge circuit 120 and the converter circuit 130 are on the secondary side of the transformer T1. The transformer T1 has a primary winding Np and a secondary winding Ns. The inductor Lm represents the magnetizing inductance on the primary winding Np of the transformer T1.

The full bridge circuit 110 comprises transistors Q1, Q2, Q3, and Q4 and a resonant LLC circuit that forms a bridge path between a bridge node 112 and a bridge node 113. The LLC circuit comprises an inductor Lr, the primary winding Np of the transformer T1, and a capacitor Cr1. The full bridge circuit 110 receives an input voltage Vin across a capacitor Cin. Current flows in one direction through the LLC circuit when the transistors Q1 and Q4 are ON (i.e., closed) while the transistors Q2 and Q3 are OFF (i.e., open) in a first half cycle, and in the other direction through the LLC circuit when the transistors Q1 and Q4 are OFF while the transistors Q2 and Q3 are ON in a following half cycle. The transistors Q1-Q4 are controlled such that an AC voltage develops on the primary winding Np.

The full bridge circuit 120 comprises transistors S1, S2, S3, and S4 and an LC circuit that forms a bridge path between a bridge node 121 and a bridge node 122. The LC circuit comprises a capacitor Cr2 and the secondary winding Ns of the transformer T1. The AC voltage on the primary winding Np is reflected on the secondary winding Ns. Current flows in the LC circuit in one direction to the converter circuit 130 when the transistors S1 and S4 are OFF while the transistors S2 and S3 are ON, and in the other direction to bypass the converter circuit 130 when the transistors S1 and S4 are ON while the transistors S2 and S3 are OFF.

In the example of FIG. 1, a drain of the transistor S2 is connected to a source of the transistor S1 at the node 121 and a drain of the transistor S4 is connected to a source of the transistor S3 at the node 122. The sources of the transistors S2 and S4 are connected to a common node 125. Note, however, that the transistors S1 and S3 are not directly connected together at a same node.

More particularly, a drain of the transistor S1 is connected to an output node 124 where an output voltage Vout is developed, whereas a drain of the transistor S3 is connected to an input node 123 of the converter circuit 130. Accordingly, current through the LC circuit flows directly to the output voltage Vout (and bypasses the converter circuit 130) when the transistors S1 and S4 are ON while the transistors S2 and S3 are OFF. However, when the transistors S1 and S4 are OFF while the transistors S2 and S3 are ON, current through the LC circuit flows to the converter circuit 130.

The transistors S1-S4 are controlled to regulate a middle voltage Vmid across the nodes 123 and 125 to regulate the output voltage Vout across the nodes 124 and 125. In the example of FIG. 1, the middle voltage Vmid is developed across a middle capacitor Cmid and the output voltage Vout is developed across a capacitor Cout. A resistor RL represents a load connected to receive the output voltage Vout.

In the example of FIG. 1, the converter circuit 130 is a buck-boost converter. The converter circuit 130 comprises transistors S5, S6, S7, and S8 and a middle inductor Lmid between a node 126 and a node 127. During buck mode operation, the transistor S7 is always ON and the transistor S8 is always OFF, while the transistors S5 and S6 are controlled to generate the regulated output voltage Vout. The output voltage Vout during buck mode operation is given by, $$Vout = \frac{2DVin}{(1+Dbuck)}\frac{Ns}{Np}$$

where D is the duty cycle of the transistor S5, Vin is the input voltage, Dbuck is the duty cycle of the converter circuit 130 in buck mode, and Ns/Np is the turns ratio of the transformer T1. Pulse width modulation (PWM) control may be applied on the transistors S5 and S6 to achieve buck regulation.

During boost mode operation, the transistor S5 is always ON and the transistor S6 is always OFF, while the transistors S7 and S8 are controlled to generate the regulated output voltage Vout. The output voltage Vout during boost mode operation is given by, $$Vout = \frac{2Vin}{(2-Dboost)}\frac{Ns}{Np}$$

where Vin is the input voltage, Dboost is the duty cycle of the converter circuit 130 in boost mode, and Ns/Np is the turns ratio of the transformer T1. PWM control may be applied on the transistors S7 and S8 to achieve boost regulation.

The transistors Q1-Q4 and S1-S8 may comprise metal oxide semiconductor field effect transistors (MOSFETs), field effect transistors (FETs), bipolar transistors, and/or other switching components. The transistors Q1-Q4 and S1-S8 may be controlled by PWM or other control methodology to generate the regulated voltage Vout.

The DC-DC converter 100 incorporates a novel partial power transfer topology, wherein the converter circuit 130 only handles around 50% of the power generated by the DC-DC converter 100. This is because the full bridge circuit 120 has provisions to bypass the converter circuit 130. By regulating the middle voltage Vmid to regulate the output voltage Vout, the LLC circuit on the primary side still operates as a non-regulated converter, which allows for improved LLC efficiency.

Figure 2:
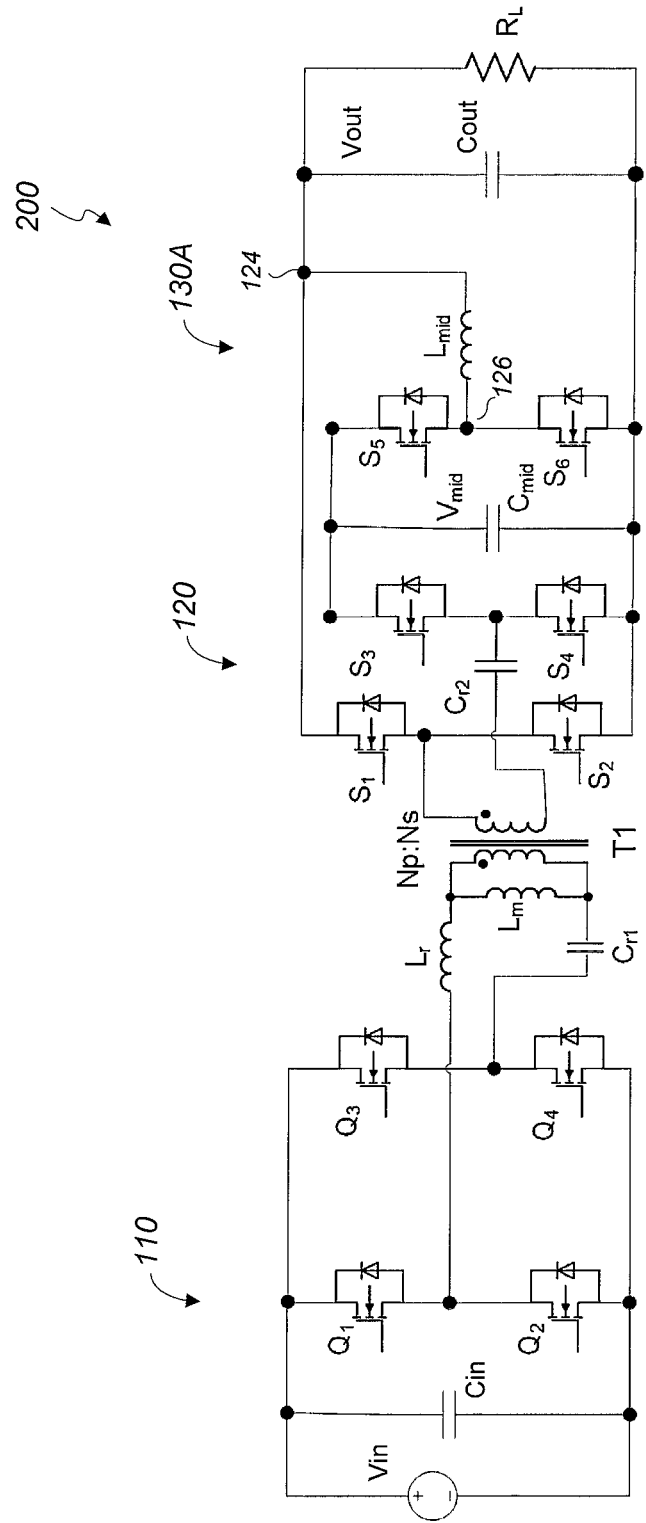
FIG. 2 shows a schematic diagram of a hybrid buck DC-DC converter in accordance with an embodiment of the present invention.

FIG. 2 shows a schematic diagram of a hybrid DC-DC converter 200 in accordance with an embodiment of the present invention. The DC-DC converter 200 is an embodiment of the DC-DC converter 100 where the converter circuit 130 (now relabeled as 130A) is configured as a buck converter. The DC-DC converters 100 and 200 are otherwise the same. That is, the DC-DC converter 200 is the same as the DC-DC converter 100 except that the transistor S7 has been replaced with a short to directly connect an end of the inductor Lmid to the node 124 (instead of going through the transistor S7) and the transistor S8 has been completely removed. The DC-DC converter 200 thus operates only as a buck converter.

Figure 3:
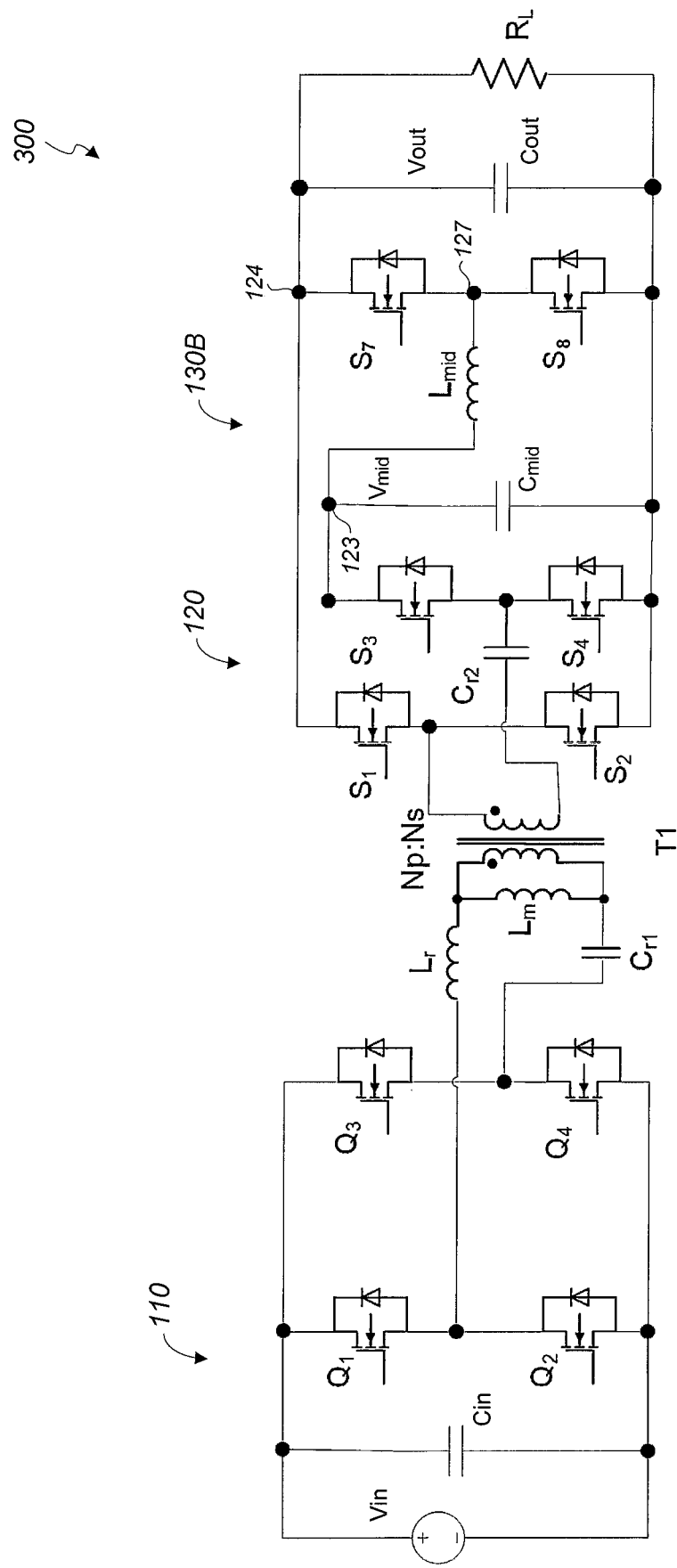
FIG. 3 shows a schematic diagram of a hybrid boost DC-DC converter in accordance with an embodiment of the present invention.

FIG. 3 shows a schematic diagram of a hybrid DC-DC converter 300 in accordance with an embodiment of the present invention. The DC-DC converter 300 is an embodiment of the DC-DC converter 100 where the converter circuit 130 (now relabeled as 130B) is configured as a boost converter. The DC-DC converters 100 and 300 are otherwise the same. That is, the DC-DC converter 300 is the same as the DC-DC converter 100 except that the transistor S5 has been replaced with a short to directly connect an end of the inductor Lmid to the node 123 (instead of going through the transistor S5) and the transistor S6 has been completely removed. The DC-DC converter 300 thus operates only as a boost converter.

A high-efficiency hybrid DC-DC converter has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A DC-DC converter comprising:
a transformer;
a first full bridge circuit that is configured to receive an input voltage to the DC-DC converter, the first full bridge circuit comprising a resonant circuit that forms a first bridge path between a first bridge node and a second bridge node of the first full bridge circuit, the resonant circuit comprising a first winding of the transformer;
a second full bridge circuit comprising an inductor-capacitor (LC) circuit that forms a second bridge path between a third bridge node and a fourth bridge node of the second full bridge circuit, the LC circuit comprising a second winding of the transformer; and
a converter circuit,
wherein a current through the LC circuit flows into the converter circuit when the current flows in a first direction between the third and fourth bridge nodes, the current bypasses the converter circuit and flows to an output node of the DC-DC converter along a path separate from the converter circuit when the current flows in a second direction that is opposite the first direction between the third and fourth bridge nodes, and an output voltage of the DC-DC converter is developed on the output node of the DC-DC converter.

2. The DC-DC converter of claim 1, wherein the second full bridge circuit further comprises a first transistor, a second transistor, a third transistor, and a fourth transistor; and
wherein a first end of the first transistor and a first end of the second transistor are connected to the third bridge node, a first end of the fourth transistor and a first end of the third transistor are connected to the fourth bridge node, a second end of the second transistor and a second end of the fourth transistor are connected to a common node, a second end of the first transistor is connected to the output node of the DC-DC converter, and a second end of the third transistor is connected to an input node of the converter circuit.

3. The DC-DC converter of claim 2, wherein the converter circuit is a buck converter comprising:
a middle inductor;

a fifth transistor; and
a sixth transistor,
wherein a first end of the fifth transistor and a first end of the sixth transistor are connected to a first end of the middle inductor, a second end of the fifth transistor is connected to the input node of the converter circuit, a second end of the sixth transistor is connected to the common node, and a second end of the middle inductor is connected to the output node of the DC-DC converter.

4. The DC-DC converter of claim 2, wherein the converter circuit is a boost converter comprising:
a middle inductor;
a fifth transistor; and
a sixth transistor,
wherein a first end of the middle inductor is connected to the input node of the converter circuit, a first end of the fifth transistor and a first end of the sixth transistor are connected to a second end of the middle inductor, a second end of the fifth transistor is connected to the output node of the DC-DC converter, and a second end of the sixth transistor is connected to the common node.

5. The DC-DC converter of claim 2, further comprising:
a middle capacitor having a first end that is connected to the input node of the converter circuit and a second end that is connected to the common node; and
an output capacitor across the output node of the DC-DC converter and the common node.

6. The DC-DC converter of claim 1, wherein the converter circuit is a buck-boost converter comprising:
a middle inductor;
a fifth transistor;
a sixth transistor;
a seventh transistor; and
an eight transistor,
wherein a first end of the fifth transistor and a first end of the sixth transistor are connected to a first end of the middle inductor, a first end of the seventh transistor and a first end of the eight transistor are connected to a second end of the middle inductor, the second end of the sixth transistor and the second end of the eight transistor are connected to the common node, a second end of the fifth transistor is connected to the input node of the converter circuit, and a second end of the seventh transistor is connected to the output node of the DC-DC converter.

7. The DC-DC converter of claim 6, wherein the converter circuit operates in buck mode of operation by keeping the seventh transistor constantly ON and keeping the eight transistor constantly OFF while controlling switching of the fifth and sixth transistors to regulate the output voltage of the DC-DC converter.

8. The DC-DC converter of claim 6, wherein the converter circuit operates in boost mode of operation by keeping the fifth transistor constantly ON and keeping the sixth transistor constantly OFF while controlling switching of the seventh and eight transistors to regulate the output voltage of the DC-DC converter.

9. A DC-DC converter comprising:
a transformer;
a first full bridge circuit that is configured to receive an input voltage to the DC-DC converter, the first full bridge circuit comprising a resonant circuit that forms a first bridge path between a first bridge node and a second bridge node of the first full bridge circuit, the resonant circuit comprising a first winding of the transformer;

a second full bridge circuit comprising a first transistor, a second transistor, a third transistor, and a fourth transistor, a second winding of the transformer and a resonant capacitor forming a second bridge path between a third bridge node and a fourth bridge node of the second full bridge circuit, a first end of the first transistor and a first end of the second transistor being connected to the third bridge node, a first end of the third transistor and a first end of the fourth transistor being connected to the fourth bridge node, a second end of the second transistor and a second end of the fourth transistor being connected to a common node, a second end of the first transistor being connected to an output node; and
a converter circuit, a second end of the third transistor being connected to an input node of the converter circuit,
wherein an output voltage of the DC-DC converter is generated across the output node and the common node.

10. The DC-DC converter of claim 9, wherein the converter circuit is configured to operate as a buck converter.

11. The DC-DC converter of claim 9, wherein the converter circuit is configured to operate as a boost converter.

12. The DC-DC converter of claim 9, wherein the converter circuit is a buck-boost converter.

13. The DC-DC converter of claim 12, wherein the converter circuit comprises:
a middle inductor;
a fifth transistor;
a sixth transistor;
a seventh transistor; and
an eight transistor,
wherein a first end of the fifth transistor and a first end of the sixth transistor are connected to a first end of the middle inductor, a first end of the seventh transistor and a first and of the eight transistor are connected to a second end of the middle inductor, the second end of the sixth transistor and the second end of the eight transistor are connected to the common node, a second end of the fifth transistor is connected to the input node of the converter circuit, and a second end of the seventh transistor is connected to the output node.

14. The DC-DC converter of claim 13, further comprising:
a middle capacitor having a first end that is connected to the input node of the converter circuit and a second end that is connected to the common node.

15. The DC-DC converter of claim 13, wherein the converter circuit operates in buck mode of operation by keeping the seventh transistor constantly ON and keeping the eight transistor constantly OFF while controlling switching of the fifth and sixth transistors to regulate the output voltage of the DC-DC converter.

16. The DC-DC converter of claim 13, wherein the converter circuit operates in boost mode of operation by keeping the fifth transistor constantly ON and keeping the sixth transistor constantly OFF while controlling switching of the seventh and eight transistors to regulate the output voltage of the DC-DC converter.

17. A DC-DC converter comprising:
a transformer;
a first full bridge circuit that is configured to receive an input voltage to the DC-DC converter, the first full bridge circuit including a first bridge path between a first bridge node and a second bridge node of the first full bridge circuit, the first bridge path comprising a first winding of the transformer;

a second full bridge circuit including a second bridge path between a third bridge node and a fourth bridge node of the second full bridge circuit, the second bridge path comprising a second winding of the transformer, the third bridge node being connected to an output node of the DC-DC converter; and a converter circuit, the fourth bridge node being connected to an input node of the converter circuit, wherein a current through the second bridge path flows in a first direction between the third and fourth bridge nodes and into the converter circuit when the current flows in a first direction, the current bypasses the converter circuit and flows to the output node of the DC-DC converter along a path separate from the converter circuit when the current flows in a second direction that is opposite the first direction between the third and fourth bridge nodes, and an output voltage of the DC-DC converter is developed on the output node of the DC-DC converter.

18. The DC-DC converter of claim 17, wherein the second full bridge circuit comprises:

a first transistor, a second transistor, a third transistor, and a fourth transistor, a first end of the first transistor and a first end of the second transistor being connected to the third bridge node, a first end of the third transistor and a first end of the fourth transistor being connected to the fourth bridge node, a second end of the second transistor and a second end of the fourth transistor being connected to a common node, and a second end of the first transistor being connected to the output node of the DC-DC converter.

19. The DC-DC converter of claim 18, wherein the third bridge node is connected to the output node of the DC-DC converter through the first transistor.

20. The DC-DC converter of claim 19, wherein the fourth bridge node is connected to the input node of the converter circuit through the third transistor.

* * * * *